Nov. 15, 1955    A. L. LEONI    2,723,865
SAFETY DEVICE FOR TRACTOR-TRAILER COMBINATIONS
Filed July 14, 1953    2 Sheets-Sheet 1
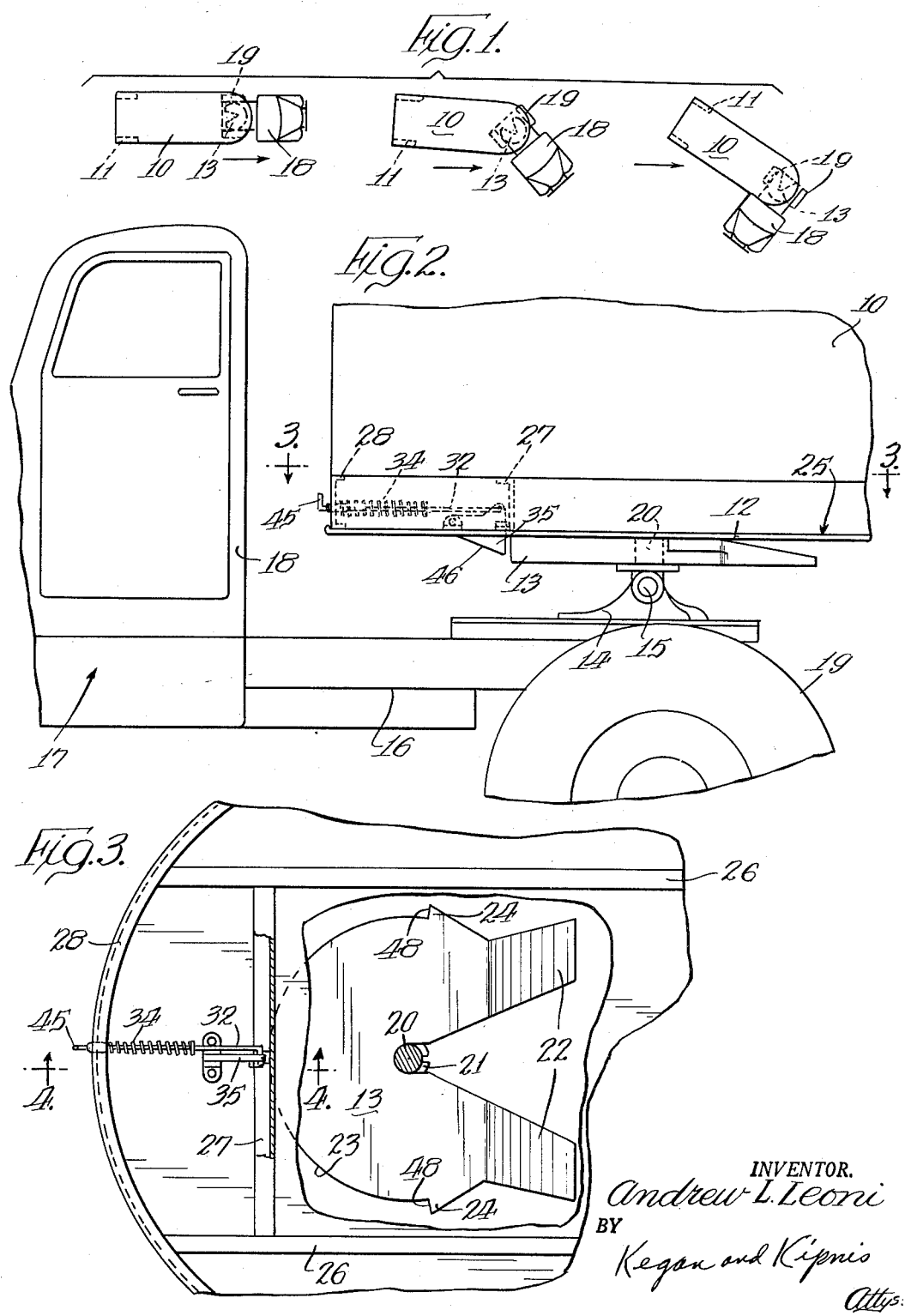
INVENTOR.
Andrew L. Leoni
BY
Kegan and Kipnis
Attys.

Nov. 15, 1955 A. L. LEONI 2,723,865
SAFETY DEVICE FOR TRACTOR-TRAILER COMBINATIONS
Filed July 14, 1953 2 Sheets-Sheet 2
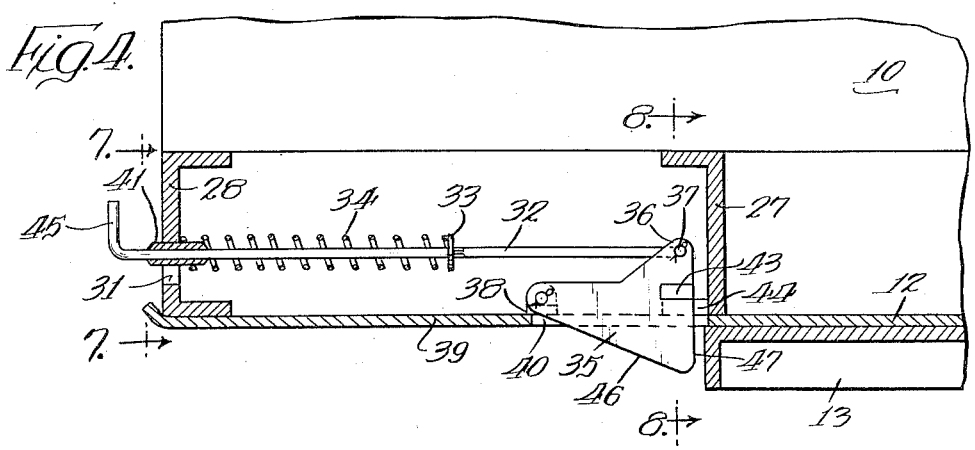
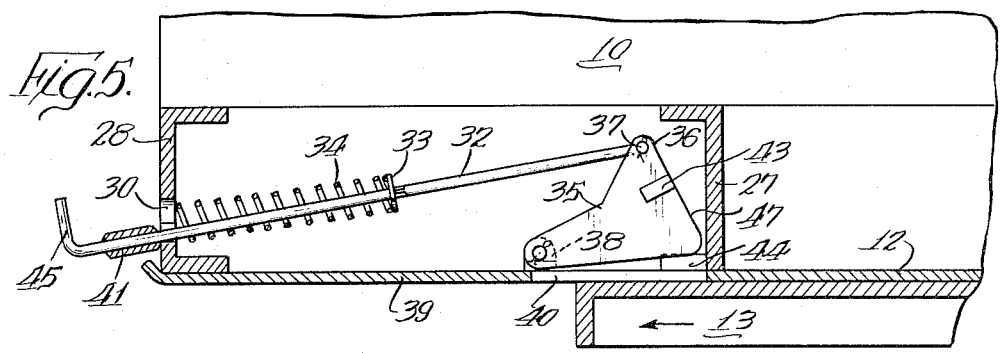
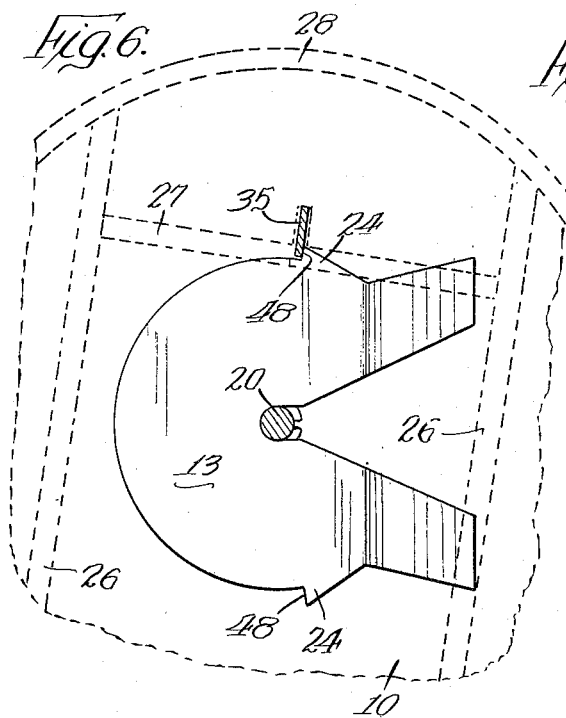
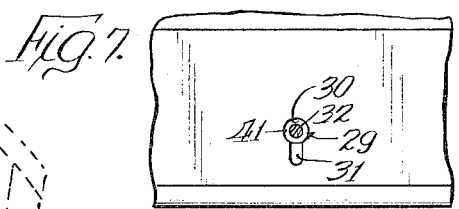
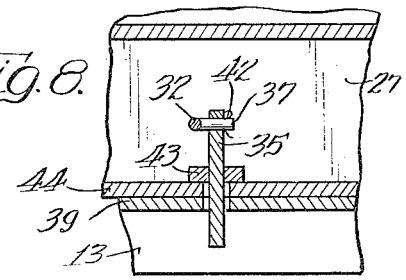
INVENTOR.
Andrew L. Leoni
BY
Kegan and Kipnis
Attys.

United States Patent Office 2,723,865
Patented Nov. 15, 1955

1

2,723,865

SAFETY DEVICE FOR TRACTOR-TRAILER COMBINATIONS

Andrew Louis Leoni, Chicago Heights, Ill.

Application July 14, 1953, Serial No. 367,944

4 Claims. (Cl. 280—432)

This invention relates to tractor-trailer combinations. More particularly, it relates to safety devices for tractor-trailer combinations. Tractor-trailer combinations are equipped with what is known as a fifth wheel which is carried by the tractor. The fifth wheel is a tiltable plate which engages a matching plate carried by the trailer. A kingpin carried by the trailer secures the coupling of the tractor and trailer combination by being positionable in a slot in the fifth wheel. The fifth wheel is further provided with a clutch mechanism for gripping a pin in the fifth wheel slot. It is inherent in the coupling mechanism that the tractor is capable of angular disposition relative to the trailer.

The usual structure of tractor and trailer combinations creates two problems, namely the problem of rebound occurring when the tractor is backed into position with respect to the trailer and resulting in failure of proper positioning of the kingpin, and the problem of jack-knifing. Jack-knifing is a condition which arises, for example, when a tractor or trailer, because of skidding or other inadvertence or accident, becomes so angularly disposed with respect to the trailer that the tractor slaps against the trailer body to thereby often result in injury to the tractor and the driver who may be crushed. The angular disposition and relationship of the tractor and trailer which will cause jack-knifing under certain circumstances is necessary under other circumstances, such as parking or backing up of the trailer.

It is an object of this invention therefore to provide a safety device for tractors and trailers which will preclude the failure of the kingpin of being properly seated in the fifth wheel slot. It is a further object of this invention to provide a device which may be selectably positioned to preclude jack-knifing and yet permit angular disposition of the tractor and trailer of the same degree as will cause jack-knifing of the tractor and trailer.

It is further an object of this invention to provide a safety device for simultaneously preventing jack-knifing of tractor and trailer combinations as well as uncoupling, which may be easily manufactured and installed on existing equipment.

Further, it is an object of this invention to provide a manually operable safety device of the character described and the position of which may be easily and visually ascertained from outside or inside the cab of the tractor and which may be set into operation by the driver when he makes air-hose and light-plug connections.

It is an additional object of this invention to provide a tractor and trailer combination having a fifth wheel with a pair of outwardly extending stops; and a manually adjustable sturdy dog to withstand the impact of jack-knifing and which may be optionally set in or above the plane of said stops whereby the safety device may be made operative or inoperative to optionally limit the degree of the relative angular relationship between the tractor and the trailer.

These and other objects and the advantages of the invention will be apparent from the following specification when considered with the accompanying drawings in which:

Figure 1 is a plan view illustrating three successive and different angular relationships of a tractor-trailer combination.

Figure 2 is a side elevational view illustrating the embodiments of this invention mounted on a tractor-trailer combination, the tractor and trailer being shown only in part.

Figure 3 is a horizontal sectional view along the plane of the line 3—3 of Figure 2, looking in the direction of the arrows.

Figure 4 is a vertical sectional view taken on the plane of the line 4—4 of Figure 3 and looking in the direction of the arrows.

Figure 5 is a vertical sectional view taken on the plane of the line 4—4 of Figure 3, but showing the dog in elevated position and the fifth wheel moving out of engagement with the trailer.

Figure 6 is a plan view of the fifth wheel, looking upwardly from the bottom of the fifth wheel, and showing the tractor and the trailer locked against jack-knifing.

Figure 7 is a vertical elevational view taken on the plane of the line 7—7 of Figure 4.

Figure 8 is a vertical sectional view taken on the plane of the line 8—8 of Figure 4 and looking in the direction of the arrows.

Referring more particularly to the drawings, a trailer 10 having wheels 11 and carrying on its front under portion a matching plate 12. The matching plate 12, when in operative position, engages the fifth wheel 13 which is pivoted to a casting 14 by means of a rock shaft 15. The casting 14 is carried on the rearwardly extending frame portion 16 of the tractor 17. As best shown in Figures 1 and 2, the tractor is provided with a conventional cab 18 and wheels 19.

The tractor and trailer are coupled together by means of a kingpin 20 which is secured in the position illustrated in Figures 3 and 6 by clutch jaws 21 which are part of a suitable clutch mechanism (not shown). The fifth wheel 13 is provided with a pair of outwardly and backwardly flared wing members 22, 22 shown in Figures 2, 3 and 6, which guide the kingpin 20 into operating position.

The front edge 23 of the fifth wheel 13 forms an arc of at least 180°, and a pair of stops 24, 24 each providing a forwardly facing shoulder 48, 48, extend outwardly in opposite directions from the ends of said front edge arc.

The trailer 10 is provided with a frame 25 and includes a pair of longitudinally extending, horizontally spaced frame members 26, 26, a transversely extending frame member 27 and an arcuately-shaped front frame member 28. Said member 28 is provided with a slot 29 having a wide upper portion 30 and a narrow lower portion 31.

A pull-rod 32 having a flange 33 extends through the slot 29. Spring 34 is mounted about pull-rod 32 and bears against flange 33 and the front frame member 28, as illustrated in Figures 4 and 5. The flat dog 35 has its upper end 36 journaled on an inner extension 37 of the pull-rod 32, the connection between pull-rod 32 and dog 35 being secured by a cotterpin. The dog 35 is pivotally connected to a bracket 38 which is carried on the base frame member 39 of the trailer 10. Frame member 39 is provided with an elongated slot 40 through which dog 35 can be forced to extend as a result of the action of spring 34 on the pull-rod 32.

Therefore, by placing the pull-rod 32 in the position shown in Figure 4, the dog 35 extends below frame member 39 and into the horizontal plane of the fifth wheel 13. To hold the dog 35 in the position illustrated in Figure 5, a boss 41 having a transverse diameter greater than the transverse dimension of the narrow lower portion 31 of slot 29, but less than the transverse dimension of the wide upper portion 30 of slot 29, is mounted on pull-rod 32 so that by pulling forwardly on the pull-rod 32 and moving it downwardly into the narrow portion 31 of the slot 29, the boss engages the forward frame member 28. On the other hand, moving the pull-rod 32 upwardly into the wide upper portion 30 of slot 29 will permit the boss 41 to slide freely in slot 29 and dog 35 to drop.

The dog 35 is provided with a pair of outwardly extending supports 43, 43 which are engageable with braces 44, 44 respectively, mounted on the lower frame member 39, to limit the downward movement of dog 35 and also to dissipate some of the vibrations and shock of the downwardly impelled dog 35.

The handle 45 of the pull-rod 32 is positioned between the cab 18 and trailer 10 and, therefore, its position can be easily seen either from the rear window (not shown) of cab 18 or from outside the cab. The position of handle 45 indicates the position of dog 35, and hence advises whether or not the trailer is locked against jack-knifing.

The dog 35 is provided with a lower downwardly and rearwardly sloping edge 46 so that when the dog is in operative position, as illustrated in Figure 4, the tractor may be coupled to the trailer without raising dog 35. However, in order to uncouple the tractor and trailer, it is necessary to elevate the dog 35 because its front face 47 stops the relative forward movement of the fifth wheel 13. In addition to the foregoing safety device, the angular relationship of the tractor and trailer is limitable by the dog 35 which is engageable with one or the other of the shoulders 48 of stops 24 when said dog is in the position illustrated in Figure 4.

Dog 35 has an exceedingly high impact resistance and is made of a heat-treated manganese alloy or equivalent material, thereby being able to withstand both the impact resulting from jack-knifing and impact which would result by engagement of the fifth wheel 13 with said dog as the result of the failure of kingpin 29 to lock in the fifth wheel.

When it is desired to lock the tractor and trailer against jack-knifing, the pull-rod 32 is moved upwardly into the upper portion 30 of the slot 29, thereby resulting in the dropping of dog 35 into the plane of the stops 24, 24, the supports 43, 43 holding the dog 35 in the desired position and precluding further dropping of the dog. In this position the dog 35 provides an additional coupling element and should the kingpin 20 fail to seat properly in the fifth wheel, the tractor-trailer combination cannot become uncoupled. To permit the tractor and trailer to assume an angular disposition of any desired degree, pull-rod 32 is moved downwardly into the narrow portion 31 of slot 29, the boss 28 engaging the forward frame member and holding pull-rod 32 in extended position and consequently dog 35 above the plane of fifth wheel 13. It is desirable not to operate the safety mechanism when the operator desires complete control over the relative angular disposition of the tractor and trailer, and also during uncoupling operations.

Inasmuch as the form of the invention disclosed herein is illustrative only, and inasmuch as varying modifications thereof can be made without departing from the spirit and scope of this invention, it is intended that all the matter contained herein shall be interpreted as being illustrative only and not in a limiting sense.

1. A device for preventing jack-knifing of tractor-trailer combinations having coupling means for said tractor and trailer including a fifth wheel and further characterized by a dog pivoted to said trailer, the frame of said trailer having a slot; a spring pressed pull-rod connected to said dog; a boss on said pull-rod to hold said dog out of the plane of said fifth wheel, said spring normally urging said dog through said slot, said fifth wheel having an arcuately-shaped front edge; stop members on said fifth wheel at opposite ends of said front edge arc, and support means on said dog, whereby predetermined relative angular disposition of said tractor and trailer engages one side of said dog with one of said stops.

2. A safety device for tractor-trailer combinations having coupling means for said tractor and trailer including a fifth wheel on said tractor, a first frame member on said trailer, said first frame member having therein a first slot; a second frame member on said trailer, said second frame member having therein a second slot; a pivoted dog having a backwardly and downwardly sloping edge, said dog when in operative position extending through said second slot and being movable by said fifth wheel to permit coupling of said tractor and said trailer and being immovable to prevent disengagement of said tractor and said trailer; a pull-rod extending through said first slot; a boss on said pull-rod and holding said dog elevated above said fifth wheel in one position of said pull-rod; spring means connected to said pull-rod and urging said dog through said second slot in another position of said pull-rod; stops on said fifth wheel, and supports connected to said dog and limiting the downward movement of said dog into the plane of said stops whereby predetermined relative angular disposition of said tractor and trailer engages said dog and said stops.

3. A device for preventing jack-knifing of tractor-trailer combinations having coupling means for said tractor and trailer including a fifth wheel and a slotted frame, characterized by a dog pivotable to said trailer; a spring pressed pull-rod connectable to said dog; a boss on said pull-rod to hold said dog out of the plane of said fifth wheel, said spring, when in operation, urging said dog through the slot in said frame; stop members for said fifth wheel and support means on said dog, whereby predetermined relative angular disposition of said tractor and trailer engages one side of said dog with one of said stops.

4. A safety device for a tractor-trailer combination of the kind wherein the tractor has a horizontal fifth wheel and the trailer has a kingpin for engagement therewith, comprising: a dog in the bottom of said trailer pivoted at the front of said dog to drop immediately in front of said fifth wheel, a vertical rear face on said dog to engage the front rim of said fifth wheel to thereby couple said tractor and said trailer if said kingpin becomes disengaged, the bottom of said dog comprising a cam surface whereby said dog is lifted by sliding contact with said tractor when said tractor is backed into said trailer; two laterally protruding stops, one on each side of said fifth wheel, to engage said dog to limit angular displacement of said trailer relative to said tractor; a third stop, on said dog to locate it in operative position to engage the front rim of said fifth wheel and the said two laterally protruding stops thereon; a spring urging said dog down into operative position; manually operated means for lifting said dog into inoperative position; and manually operated means for latching said dog in inoperative position, the position of said means being visible from the cab of said tractor to indicate the position of said dog.

References Cited in the file of this patent

UNITED STATES PATENTS

| | | |
|---|---|---|
| 2,146,145 | Huffman et al. | Feb. 7, 1939 |
| 2,400,738 | Brown | May 21, 1946 |
| 2,438,346 | Mooney | Mar. 23, 1948 |
| 2,462,211 | Moore | Feb. 22, 1949 |
| 2,567,312 | Apgar | Sept. 11, 1951 |